United States Patent
Drabish et al.

(10) Patent No.: US 11,446,623 B2
(45) Date of Patent: Sep. 20, 2022

(54) REMOTE PRESSURE SENSING FOR POLYMER REACTOR CONTROL

(71) Applicant: W. R. Grace & Co.-Conn, Columbia, MD (US)

(72) Inventors: Jeffrey Drabish, Columbia, MD (US); Jan Van Egmond, Columbia, MD (US); Thomas Gelzer, Columbia, MD (US)

(73) Assignee: W. R. Grace & Co.-Conn, Columbia, MD (US)

( * ) Notice: Subject to any disclaimer, the term of this patent is extended or adjusted under 35 U.S.C. 154(b) by 0 days.

(21) Appl. No.: 16/959,218

(22) PCT Filed: Dec. 14, 2018

(86) PCT No.: PCT/US2018/065714
§ 371 (c)(1),
(2) Date: Jun. 30, 2020

(87) PCT Pub. No.: WO2019/152105
PCT Pub. Date: Aug. 8, 2019

(65) Prior Publication Data
US 2020/0406213 A1    Dec. 31, 2020

Related U.S. Application Data (60) Provisional application No. 62/624,321, filed on Jan. 31, 2018.

(51) Int. Cl.
*B01J 8/18* (2006.01)
*B65G 53/16* (2006.01)
(Continued)

(52) U.S. Cl.
CPC ........... *B01J 8/1809* (2013.01); *B01J 8/1827* (2013.01); *B65G 53/16* (2013.01); *B65G 53/66* (2013.01);
(Continued)

(58) Field of Classification Search
USPC .......................................................... 526/61
See application file for complete search history.

(56) References Cited

U.S. PATENT DOCUMENTS 6,255,411 B1 *   7/2001   Hartley ................... B01J 8/003
                                                    526/61
6,815,512 B2    11/2004   Olson et al.
(Continued)

FOREIGN PATENT DOCUMENTS

CN       101448921 A      6/2009
CN       102015087 A      4/2011
(Continued)

OTHER PUBLICATIONS

International Search Report of the International Searching Authority for PCT/US2018/065714 dated Feb. 26, 2019.
(Continued)

*Primary Examiner* — Fred M Teskin
(74) *Attorney, Agent, or Firm* — Foley & Lardner LLP (57) ABSTRACT

The present disclosure relates to methods for controlling gas phase polymerization reactors. A method for controlling a fluidized bed reactor can include forming a fluidized bed in a reactor followed by discharge of polymer product from the reactor to a product discharge tank. The polymer product can then be discharged from the product discharge tank to a blow tank and the pressure of the blow tank is measured. The pressure measured in the blow tank can then be used to control the reactor by changing one or more reactor operating inputs based on the measured blow tank pressure.

15 Claims, 2 Drawing Sheets

(51) Int. Cl.
  *B65G 53/66* (2006.01)
  *C08F 2/34* (2006.01)
  *B01J 8/24* (2006.01)

(52) U.S. Cl.
  CPC ....... *C08F 2/34* (2013.01); *B01J 2208/00539* (2013.01); *B01J 2208/00769* (2013.01)

(56) References Cited

U.S. PATENT DOCUMENTS

| | | |
|---|---|---|
| 7,025,938 B2 | 4/2006 | Olson et al. |
| 8,980,195 B2 | 3/2015 | Pelton |
| 2001/0024625 A1 | 9/2001 | Olson et al. |
| 2001/0034422 A1 | 10/2001 | Hartley et al. |
| 2005/0085599 A1 | 4/2005 | Olson et al. |
| 2009/0214395 A1 | 8/2009 | Parrish et al. |

FOREIGN PATENT DOCUMENTS

| | | |
|---|---|---|
| EP | 1 767 550 A1 | 3/2007 |
| WO | WO-01/28900 A1 | 4/2001 |

OTHER PUBLICATIONS

Extended European Search Report on EP Application No. 18904090.0 dated Aug. 17, 2021 (7 pages).
First Office Action and Search Report on CN Application No. 201880085001.7 dated Sep. 27, 2021 (24 pages, English translation included).
International Preliminary Report on Patentability on PCT/US2018/065714 dated Aug. 4, 2020 (7 pages).
First Examination Report on IN Application No. 202017034908 dated Apr. 5, 2022 (English translation included, 5 pages).
Office Action on ID Application No. P00202005468 dated May 10, 2022 (English translation included, 4 pages).

\* cited by examiner

REMOTE PRESSURE SENSING FOR POLYMER REACTOR CONTROL

RELATED APPLICATIONS

The present application is the U.S. National Stage of International Patent Application No. PCT/US2018/065714, filed on Dec. 14, 2018, which claims priority to U.S. Provisional Application Ser. No. 62/624,321, having a filing date of Jan. 31, 2018, each of which is incorporated herein by reference in its entirety.

BACKGROUND

The present disclosure relates to methods for reactor system control. More specifically, the present disclosure relates to controlling fluidized bed reactors in the production of polymers.

Fluidized bed reactors are known in the art of polymer production. A fluidized bed is solid-particulate mixture that exhibits fluid-like properties. In polymer reactors, fluidized beds are typically created by introducing pressurized monomers and other fluids into a bed of catalyst and polymer particulates. The fluidized bed disperses and suspends the catalyst and polymer particles throughout the fluid. Without a fluidized bed, the catalyst particulates would have a tendency to fall out of suspension and coalesce on the bottom of the reactor.

When the catalyst particles are allowed to coalesce and form a solid mass on the bottom of the reactor, the fluid/catalyst interaction is reduced because the catalyst particulates displace the fluid. The fluidized bed helps maximize the potency of the catalyst by increasing the effective surface area of the catalyst, allowing for monomers and polymers within the system to flow around and interface with the full surface area of the catalyst. The fluidized bed also helps keep the polymer/monomer composition well mixed, creating a homogeneous environment within the fluidized bed and supporting the production of uniform and consistent polymer products. In addition, the mixing can assist in avoiding unwanted occurrences such as chunking, fouling of the distributor plate, and the formation of temperature bands within the reactor.

A fluidized bed is generally maintained in the bottom portion of the reactor. Controlling the fluidized bed and having the reactor run optimally can be a difficult task, and engineers and operators are constantly striving for new ways to more effectively accomplish this goal. Furthermore, the difficulty of this task can be magnified when retrofitting equipment or using existing equipment to adopt new production processes. One method for monitoring the conditions within the fluidized bed has been to take temperature measurements on the reactor inside surface. However, each reactor has unique internal geometries and surface temperature measurements have proven less than ideal for controlling and understanding the environment within the reactor. Therefore, the art is in need of new methods for controlling and maximizing the efficiency of polymer reactors.

SUMMARY

The present disclosure is directed towards methods for controlling polymer reactors. The methods disclosed can be particularly advantageous for UNIPOL® gas phase polymer reactors employing a fluidized bed. In a specific example, the methods can be adapted to controlling a wet zone and fluidized bed penetration in a UNIPOL® polypropylene reactor.

In an embodiment, a reactor control method can include forming a fluidized bed in a reactor, the fluidized bed including monomers and catalyst, and producing a polymer product. When a sufficient amount of product has accumulated in the reactor, the polymer product can be discharged from the reactor to a product discharge tank. After settling in the product discharge tank, the polymer is released into a blow tank and the pressure in the blow tank is measured. The measured blow tank pressure is then analyzed to change one or more reactor operating inputs based on the measured blow tank pressure.

It can be particularly advantageous in some embodiments to determine the blow tank peak pressure (e.g., when reactor product is flashed in the blow tank) and use the blow tank peak pressure to change the one or more reactor operating inputs. The polymer product can be discharged from the product discharge tank to the blow tank two or more times while the reactor is in operation. The blow tank pressure can be monitored and analyzed for each discharge from the product discharge tank. The reactor can then be controlled based on the multiple blow tank pressure recordings corresponding to each discharge. In a similar fashion, multiple peak pressures for each discharge of product into the blow tank can be determined and the reactor can be controlled based on this information.

When multiple blow tank pressures are recorded, each corresponding to a discharge of product into the blow tank, the blow tank pressures can be averaged for use in controlling the reactor. A weighted average can be used that emphasizes more recent reactor conditions. Furthermore, trends can be detected in the blow tank pressure measurements and the blow tank pressure trends can be used to control the reactor.

The methods revealed in the present disclosure can provide increased reactor control and a better assessment of the conditions within the reactor. The processes and superior control techniques can increase the production and quality of the polymer product. Reactor efficiency can be increased as stagnant areas, chunk formation, gel formation, and sheeting can be reduced or eliminated.

Increased reactor control can also increase reactor operating time and increase the intervals between reactor cleaning and maintenance. Frequent plugging of filters and agglomerate removal can be reduced or avoided. Wear on pumps and compressors can be minimized. Furthermore, the methods and processes presented in this disclosure may be implemented without requiring additional equipment and even without bringing the reactor out of service. Other features and aspects of the present disclosure are discussed in greater detail below.

BRIEF DESCRIPTION OF THE DRAWINGS

A full and enabling disclosure is set forth more particularly in the remainder of the specification, including reference to the accompanying figures, in which.

DETAILED DESCRIPTION

It is to be understood by one of ordinary skill in the art that the present disclosure contains a description of exemplary embodiments only, and is not intended to limit the broader aspects of the present disclosure.

A fluidized bed is generally maintained in the bottom portion of a gas-phase polymer reactor. In polymer reactors, "wet zones" can be employed to increase the settled bulk density (SBD). Furthermore, utilizing a wet zone can reduce or even eliminate the risk of sheeting, chunking, overheating, bed collapse, and/or reactor shutdown. In summary, employing a wet zone in a fluidized-bed polymer reactor can increase overall polymer production and quality.

The wet zone of a gas-phase fluidized-bed polymerization reactor can be defined as an area where condensed liquids persist. The wet zone is generally maintained in the bottom of the reactor, or just above the distributor plate and extending upwards from a few to tens of meters into the reactor. The wet zone can be formed by, e.g., maintaining a temperature less than or equal to the dew point-temperature (DPT)+2° C. in a region of the reactor. The wet zone can have a DPT that is from 60° C., or 62° C., or 64° C., or 66° C., 68° C., or 70° C., or 72° C., to 74° C., or less than 75° C.

The height of the wet zone can also be controlled to be a specific percentage of the height of the fluidized-bed or a specific percentage of the height of the reactor as a whole. The condensed liquid fluidizing medium of the wet zone can include reactive (e.g., monomers) and non-reactive agents. The non-reactive agents can include carrier gases such as nitrogen or hydrogen. Other liquid or gaseous hydrocarbons can be included as fluidizing mediums for helping to maintain the wet zone and fluidized bed. Examples of such hydrocarbons include ethane, propane, and isopentane.

Optimally controlling a fluidized bed reactor, and particularly a fluidized bed reactor utilizing a wet zone, can be a difficult task. Small changes in reactor conditions and reactor inputs can result in loss of the wet zone. Sheeting, chunking, fouling, bed collapse, poor product quality, and even reactor shutdown can occur if the reactor inputs are not precisely controlled. The difficulty in optimizing a fluidized bed reactor and a wet zone can be elevated when retrofitting equipment or using existing equipment to adopt new production processes. One method for monitoring the conditions within the fluidized bed has been to take temperature measurements on the reactor inside surface. Pressure measurements at different points within the reactor have also been used for reactor control. However, each reactor has unique internal geometries and surface temperature measurements and reactor pressures have proven less than ideal for maintaining the wet zone, maintaining the fluidized-bed, and otherwise controlling the environment within the reactor.

On a basic level, methods of the present disclosure can include taking sample reactor sample compositions or product discharge compositions from the reactor, flashing the compositions (or product discharge), and measuring the associated pressures. The methods revealed can provide a better assessment of reactor and wet zone conditions, as well as superior reactor control. Specifically, methods of the present disclosure can stabilize and reduce oscillations in critical parameters such as production rates, monomer gas partial pressures, recycle gas weight percent condensation, and liquid penetration level. The evaluation methods and superior control techniques can also increase the production rate and quality of the polymer product. Reactor efficiency can be increased as stagnant areas, chunk formation, gel formation, and sheeting can be reduced or eliminated.

Figure 1:
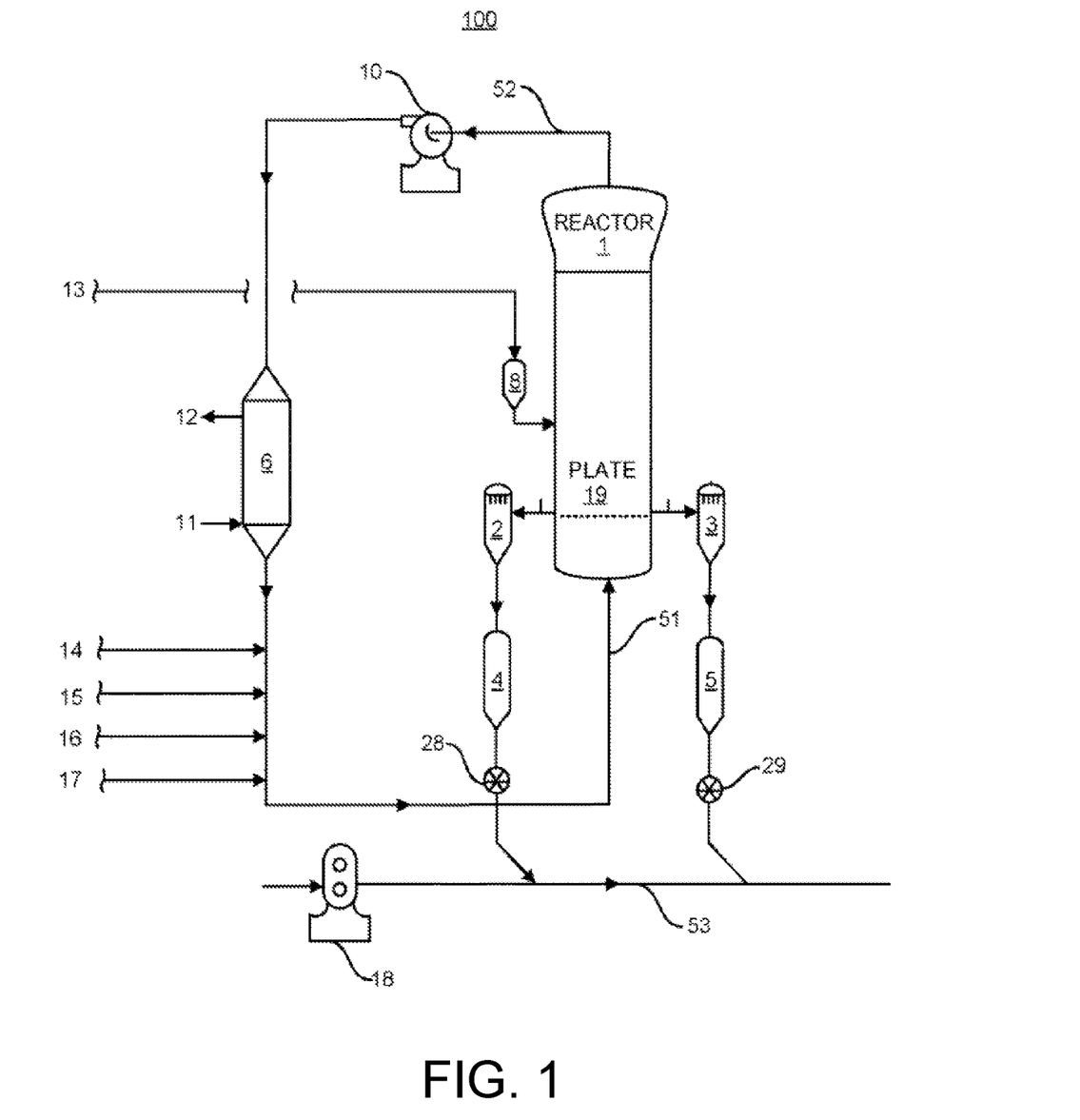
FIG. 1 a diagram of a polymer reactor system.

FIG. 1 is a diagram of a polymer reactor system 100. The reactor system 100 includes a reactor 1 having a distributor plate 19. A fluidized bed can be formed above the distributor plate 19 and can include catalyst, monomer, polymer, co-catalyst, fluidizing medium and other materials. Additional catalyst, cocatalyst, or procatalyst can be introduced from the catalyst tank 8 by way of the catalyst line 13. After having passed through the fluidized bed, gasses from the bottom of the reactor 1 can move upward and into the recycle line 52 where they are compressed by the recycle compressor 10. The recycle compressor 10 acts as the pressure source to drive recycle gas back into the bottom of the reactor 1.

The recycle line 52 leads to a heat exchanger 6 which is generally used to cool the recycle gas and control the operating temperature of the reactor 1. Cooling water or another temperature adjustment medium can be fed to the inlet 11 and, after the medium exchanges heat with the process side, it can flow out of the outlet 12. By adjusting the flowrate and/or the temperature of the temperature adjustment medium (typically water), the reactor bottom inlet 51 temperature and phase properties can be controlled.

The recycle line 52 can also serve as a place to introduce additional materials into the reactor 1. For example, the recycle line 52 can include a monomer input 14, a fluidizing medium input 15, a carrier gas input 16, and another catalyzing agent input 17. The recycle compressor 10 can drive the materials coming from various inputs (e.g., 14-17) into the bottom of the reactor 1.

Once a sufficient amount of product has formed in the reactor 1, the product can be discharged into product discharge tank A 2. When to remove product from the reactor 1 is often determined by the amount of product in the reactor 1, its settled bulk density, or its bed weight and bed level. For example, the particles of olefin-based polymer within the reactor can have a settled bulk density ("SBD") greater than 23.5 lb/ft$^3$. In an embodiment, the process includes forming particles of olefin-based polymer having an SBD greater than 23.5 lb/ft$^3$, or 24.0 lb/ft$^3$, or 25.0 lb/ft$^3$, or 26.0 lb/ft$^3$ to 27.0 lb/ft$^3$, or 28.0 lb/ft$^3$, or 29.0 lb/ft$^3$, or 30.0 lb/ft$^3$. After the product has collected in product discharge tank A 2, the product can then be released into blow tank A 4. Finally, the product can flow through the blow tank product valve 28 and be conveyed using carrier gas coming from the carrier gas compressor 18. The carrier gas will generally send the product away for storage or further processing.

The process for removing product from the reactor 1 involving the product discharge tank A 2 and blow tank A 4 can be conducted in the exact same fashion with product discharge tank B 3 and blow tank B 5 (shown in FIG. 1 with blow tank product valve 29). However, it should be noted that parallel product discharge tank structures are not necessary and the reactor system can operate using a single discharge train consisting of a single product discharge tank and single blow tank. Furthermore, three, four, or even more product discharge trains (each consisting of a product discharge tank and a blow tank) can be connected to the reactor 1.

Having multiple product discharge tanks can be particularly advantageous as they allow increased settling and off gassing time in the product discharge tank and blow tank. Regardless, it should be understood that any description in this disclosure directed toward the "A" side can just as easily be applied to the "B" side (or C, D, E, or F side, should they exist).

Figure 2:
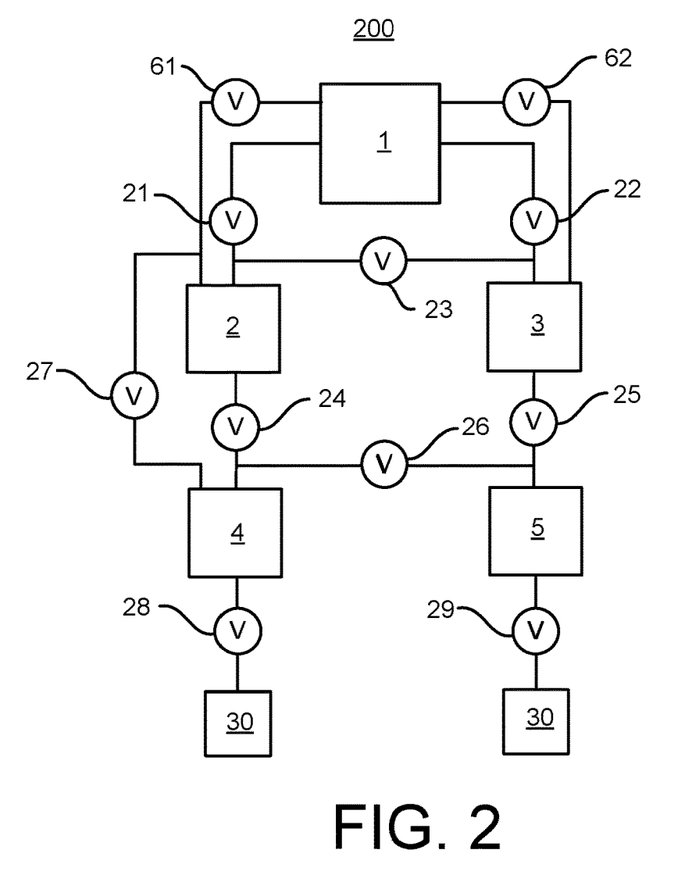
FIG. 2 is a schematic diagram of the polymer reactor system of FIG. 1 showing crossties and pressure equilibration lines.

FIG. 2 is a schematic diagram of the reactor system 100 of FIG. 1 showing crossties and pressure equilibration lines between the reactor 1, product discharge tanks (2, 3), and the blow tanks (4, 5). The reactor system 200 of FIG. 2 can behave in much the same way as described with respect to the reactor system 100 of FIG. 1. The additional details of the crossties and pressure equilibration lines will now be discussed.

FIG. 2 shows a product discharge tank input valve A 21 for removing product from the reactor 1 and conveying it to product discharge tank A 2. Corresponding product discharge tank input valve B 22 accomplishes the same task in relation to product discharge tank B 3. A product discharge tank cross tie valve 23 is placed between product discharge tank A and B (2,3) and allows for the pressures between product discharge tank A and B (2,3) to equilibrate. A product discharge tank overhead valve A 61 is included that allows for gasses in the product discharge tank A 2 to be carried back into the reactor 1. A corresponding product discharge tank overhead valve B 62 is included to accomplish the same task in relation to product discharge tank B 3.

Blow tank input valves A and B (24,25) are included to release product from the product discharge tanks into their corresponding blow tanks A and B (4,5). Similar to the product discharge tank cross tie valve 23, a blow tank cross tie valve 26 is provided to allow the pressure of blow tank A and B (4,5) to equilibrate. Furthermore, each blow tank can include a blow tank overhead valve (27) for removing excess gas from blow tanks and recycling the gas back to the reactor 1. Reactor systems (including reactor system 100 and 200) have been introduced to explain the methods and processes of the present disclosure. However, it should be understood that the presented systems are only exemplary in nature and the methods and concepts taught herein can just as easily applied to other reactor systems.

An exemplary process for manufacturing polymer in relation to systems 100 and 200 will now be discussed. The reactor 1 can operate using a fluidized bed which is formed above the distributor plate 1. The fluidized bed can include a wet zone that extends upward into the reactor 1. A preferable height for the wet zone may be on the order of two or three meters, depending on the particular reactor system and product requirements. For a more detailed explanation of how to create and optimize wet zones and fluidized beds in reactors, U.S. Pat. No. 9,556,291 is incorporated herein by reference.

Once a sufficient amount of polymer product has accumulated in the reactor 1, the product is discharged through valve 21 or 22 and into one of the corresponding product discharge tanks (2,3). While product is being discharged into product discharge tank A 2, typically valves 23, 24, and 27 will be closed and valve 61 may remain open. The product discharge tanks generally draw from near the bottom of the reactor 1 where the pressure is relatively high. Valve 61 may be left open to allow pressure to escape from product discharge tank A 2 back into the top of the reactor 1 where the pressure relatively low. Furthermore, after valve 21 is closed, valve 61 can be opened (or left open) to remove excess gas from product discharge tank A 2. The excess gas off gassing of the product can include monomers (and other gasses) that would optimally all stay within the reactor 1 to maximize product yield.

The product discharge tank crosstie valve 23 can be opened to equilibrate the pressure between the product discharge tanks (2,3). This can occur before, after, or during the discharge of product into product discharge tank A 2. When the time comes, the product can be discharged from product discharge tank A 2 into blow tank A 4 by opening valve 24. The timing of the opening of valve 24 can be set based on when the product discharge tank reaches a reference pressure (e.g., a first reference pressure). Alternatively, valve 24 can be opened after the product has resided in the product discharge tank for a certain period of time (e.g., 1, 3, 5, or 10 seconds). Other options are available for determining when to discharge to the blow tank; however, standardizing when to discharge into the blow tank can be advantageous for implementing the methods disclosed herein.

In one embodiment, valves 26, 27, and 28 remain closed while valve 24 is open. However, valve 27 can also be left open (or partially open) to allow gas to flow back into the product discharge tank A 2 when product is released through valve 24. Valves 21, 23, and 61 may also be closed as the product is discharged into blow tank A 4. Once the product is discharged into blow tank A 4, the product tends to flash, off gassing and raising the pressure of blow tank A 4. A key aspect of the methods taught in this disclosure is measuring the pressure of the blow tanks (4, 5) as the product enters the blow tanks and flashes.

The methods described herein can optimize reactor conditions by measuring flashing vessel pressures (e.g., blow tank pressures), including peak pressures. In a specific example, the methods are able to provide superior control of reactor wet zones and reactor fluidized bed penetration by monitoring flashing vessel pressures. It is believed that flash vessel pressures can provide for a better understanding of reactor conditions because flash vessel pressures provide an indirect measurement of the overall reactor composition, specifically the wet zone or fluidized bed composition, in combination with the reactor's effective operating temperatures and pressures.

In a basic form, a method for controlling the reactor can include siphoning product from the reactor, isolating the product, and flashing the product in a separate vessel. When the product is isolated and prior to flashing, the product can be degassed by reducing the pressure of the product's environment in a first vessel. The product can be brought to a first reference pressure while it is isolated in the first vessel. The product can then be flashed by introducing the product to an even lower pressure environment in a second vessel, which begins at a second reference pressure. Instead of establishing reference pressures, the methods of the present invention can utilize changes in pressure or absolute pressure measurements in the either the first or second vessel.

In an embodiment, a method for controlling a fluidized bed reactor can include forming a fluidized bed within the reactor 1. The fluidized bed can be located above the distributor plate 19 and have a mixed composition of monomers, polymer product, fluidizing medium, and catalyzing agents (including, e.g., catalysts, co-catalysts, and procatalysts). Polymer product can be drawn from the reactor 1 when a sufficient amount of product has accumulated. Product removal timing, duration, and volume can be determined based on, for example, the settled bulk density in the reactor, the size of the reactor, and the size and number of product discharge tanks (2,3).

Once the product is in the product discharge tank (2,3), the product discharge tank (2,3) can be brought to a first reference pressure. The first reference pressure can be that of a point near the top of the reactor 1, which can be achieved by opening the product discharge tank overhead valves (61,62). Prior to releasing the product into the blow tank (4,5), the blow tank can be brought to a second reference pressure. The second reference pressure can be achieved in blow tank A 4, for example, by closing valves 24, 26, and 27 and opening valve 28. Therefore, when valve 28 is open, the second reference pressure may be atmospheric pressure or the pressure in the product discharge line 53. Then, valve 28 can be closed and valve 24 opened, allowing the product to drop from product discharge tank A 2 and flash into blow tank A 4. The pressure of the flashing product in blow tank A 4 can then be measured and this pressure can be used to control the reactor 1. In a specific non-authoritative example, if the pressure recorded in the blow tank 4 is high, the reactor may be slowed by increasing reactor cooling and/or removing catalyst from the reactor. In another example embodiment, a controller can adjust the inlet gas weight percent that is condensed and the propylene partial pressure, which then manipulates the reactor's propylene flow.

Figure 3:
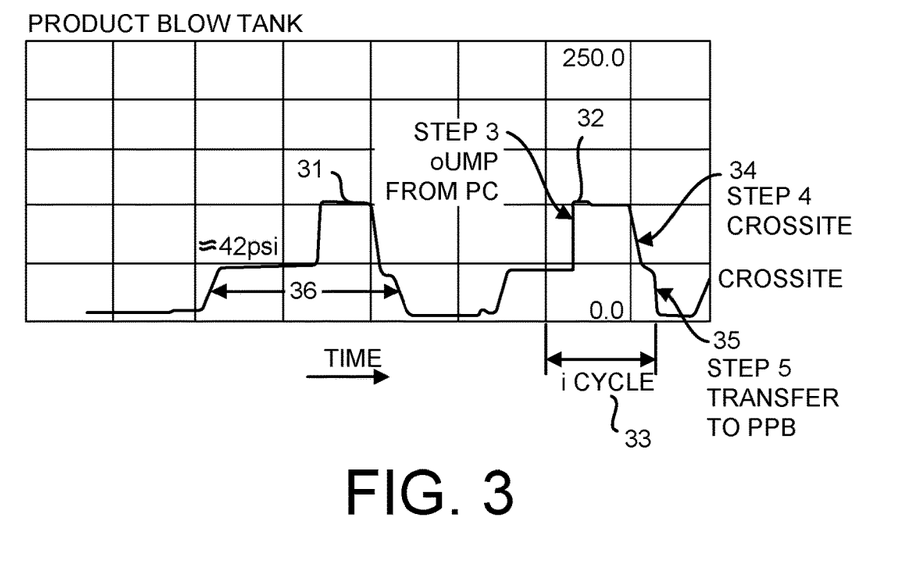
FIG. 3 is a graph showing blow tank pressures corresponding to product discharges from a product discharge tank.

FIG. 3 is one embodiment of a graph showing blow tank pressures corresponding to flashing of product discharge. As the blow tank input valve (24, 25) opens, the pressure increases and a first pressure profile 36 is created. The pressure profile 36 can be used (e.g., by integrating under the pressure profile curve) to determine the operating conditions of the reactor 1 and to adjust reactor inputs. A first peak pressure 31 is shown, which corresponds to a first cycle of product flashing in the blow tank (4, 5). The peak pressure in the blow tank (or other vessel where product is flashed) can be determined and used in controlling the reactor inputs. FIG. 3 also shows a second cycle 33 of product flashing in the blow tank along with a second peak pressure 32. Furthermore, the opening of a crosstie valve (e.g., valve 26) can be seen at pressure reading 34. At pressure reading 35, the product is released from the blow tank into a product collector 30 or product discharge line 53.

In some embodiments, the reactor 1 can be controlled by analyzing multiple blow tank pressures. The multiple blow tank pressures can be in the form of peak pressures, pressure profiles, and pressures taken at specific times after the opening of the blow tank input valve (e.g., ten second after the blow tank input valve is opened). Multiple pressure readings, profiles, and/or peak pressures can be averaged in determining how to adjust the inputs to the reactor system. Specifically, moving averages can be used which average the most recent sequences of pressure readings (e.g., the last five or ten pressure reading cycles). Instead of a simple moving average based on a number of pressure readings, a weighted moving average can be performed that emphasizes more recent pressure readings. Both the moving average and weighted moving average can also be time based instead of frequency based (e.g., the peak pressures can be averaged over the last ten minutes instead of the last ten cycles). Additionally, trends or rates of change of pressures within the blow tank can be analyzed and the reactor system inputs can be adjusted based on the trends or rates of change. Perhaps most advantageous, the blow tank pressures can be incorporated into reactor system models that take into account multiple factors including measurements such as reactor temperature profiles, product composition, reactor pressures, reactor density, catalyst concentration, etc.

The present disclosure has discussed changing or adjusting the reactor system inputs based on the pressure and pressure profiles created as product is flashed into the blow tanks. The goal of changing the product inputs can be to maintain a wet zone in the reactor at a proper height or density, adjust the penetration of the fluidized bed into the reactor, or otherwise maximize performance of the reactor. Reactor inputs include the addition or removal of any composition (e.g., by opening or closing valves within the reactor system) and the removal or addition of energy (e.g., heating, cooling, or mixing within the reactor system). Furthermore, reactor inputs can be reactor set points that are achieved indirectly, such as establishing certain temperatures or product profile compositions in the reactor. Non-limiting examples of reactor system inputs include recycle gas flowrate, recycle gas cooling, bed temperature set point, addition of monomer raw materials, addition of fluidizing medium, removal of fluidizing medium, discharge of product to the product discharge tank, addition of catalyst/co-catalyst/procatalyst, removal of catalyst/co-catalyst/procatalyst, changing monomer partial pressure, changing the phase of material entering the reactor, and changing gas/liquid fraction (or weight percent condensation) entering the reactor.

The methods disclosed herein can be applied to a wide range of polymer production including olefin-based polymers. However, the methods can be particularly advantageous for producing polypropylene in a UNIPOL® reactor system. More specifically, the methods disclosed herein have been found to be well suited for optimizing the wet zone and/or the penetration of the fluidized bed within a UNIPOL® polypropylene reactor.

The methods of the present invention can be applied to the production of any polymer product. For example, the methods can be applied to the polymerization of alpha-olefins such as ethylene and propylene. The polyolefin may be any homopolymer or copolymer of one or more olefins. For example, the polyolefin may be a homopolymer of ethylene or a copolymer of ethylene with one or more α-olefins such as propylene, 1-butene, 1-pentene, 1-hexene, 1-heptene, 1-octene, 1-nonene, 1-decene, and 4-methyl-1-pentene. The polyolefin may also be a homopolymer of propylene or a copolymer of propylene with one or more α-olefins such as ethylene, I-butene, 1-pentene, 1-hexene, 1-heptene, 1-octene, 1-nonene, 1-decene, and 4-methyl-1-pentene. The polyolefins can also include olefin monomers of butene-1, pentene-1,4-methylpentene-1, hexene-1, octene-1 and styrene. Other monomers can include polar vinyl, conjugated and non-conjugated dienes, acetylene and aldehyde monomers. The methods can also be applied to the production of interpolymers which include the polymerization of at least two different types of monomers.

The methods can include the use of catalyzing agents including catalysts, procatalysts, and cocatalysts. The catalyzing agents can include Ziegler Natta catalyzing agents. Catalysts used in the reactor system can include, for example, coordinated anionic catalysts, cationic catalysts, free-radical catalysts, and anionic catalysts. The catalysts can be introduced as partially and/or fully activated precursor compositions as well as catalysts modified by prepolymerization or encapsulation.

The catalyzing agents can include external electron donors, which are compounds added independent of procatalyst formation and include one or more functional groups that donate a pair of electrons to a metal atom. Mixed external electron donors can be used which contribute two or more external electron donors. The external electron donors in the catalyzing agents can affect the level of molecular weight, tacticity, molecular weight distribution, melting point, and oligomer level. The external electrons donor may be selected from one or more of amines, silicon compounds, bidentate compounds, ethers, carboxylates, ketones, amides, carbamates, phosphines, phosphates, phosphites, sulfonates, sulfones, sulfoxides, and combinations thereof. An example of a specific catalyst that can be applied is triethyl aluminum (TEAL).

The methods disclosed herein can use fluidizing mediums to maintain the fluidized bed, including a wet zone. The fluidizing medium can include monomers as well as non-reactive agents. The non-reactive agents can include carrier gases such as nitrogen or hydrogen. Other liquid or gaseous hydrocarbons can be included as fluidizing mediums for helping to maintain the wet zone and fluidized bed. Examples of such hydrocarbons include ethane, propane, and isopentane.

In operating the reactor system, the weight percent condensation of the total recycle stream can be adjusted based entirely or in part on the pressure measurements taken in the blow tank. Typical weight percent condensation entering the reactor can be in the range of 2%, 3%, 5%, 8%, 10%, 12%, 15%, 18%, 20%, 23%, 25%, 28%, 30%, 35% or even greater condensation levels can be applied while still maintaining efficient and stable polymer production. The weight percent condensation (or liquid) based on the total weight of the recycle stream can therefore be in the range of between 1 to 50 weight percent, 10 to 40 weight percent, or 15 to 35 weight percent. However, it should be noted that weight percent condensation is only a reactor input controlled with the ultimate objective of efficient and high quality polymer production. Therefore, weight percent condensation from 0% to 100% can be applied as a means to achieve these end goals.

An overview of reactor compositions and catalyzing agents will now be provided. In an embodiment, the fluidizing medium includes from 75 wt % to 95 wt % propylene monomer and from 5 wt % to 25 wt % condensed liquid propane. The HAC catalyst composition is a Ziegler-Natta catalyst composition having an internal electron donor composed of a substituted phenylene aromatic diester (ZN-SPAD catalyst). The process includes contacting the ZN-SPAD catalyst with the propylene and forming particles of propylene homopolymer having a settled bulk density greater than 25.0 lb/ft³. In an embodiment, the process includes forming particles of propylene homopolymer having a settled bulk density greater than 25.0 lb/ft³ to 28 lb/ft³.

The ZN-SPAD catalyst composition is a HAC catalyst composition and includes an internal electron donor comprising a substituted phenylene aromatic diester. The Ziegler-Natta catalyst composition includes a procatalyst composition, and may optionally include a cocatalyst, an external electron donor, and an activity limiting agent. The procatalyst composition includes a combination of a magnesium moiety, a titanium moiety and an internal electron donor. The internal electron donor includes a substituted phenylene aromatic diester (or "SPAD").

The procatalyst composition is produced by halogenating/titanating a procatalyst precursor in the presence of the internal electron donor. As used herein, an "internal electron donor" is a compound added or otherwise formed during formation of the procatalyst composition that donates at least one pair of electrons to one or more metals present in the resultant procatalyst composition. The internal electron donor is the substituted phenylene aromatic diester. Not wishing to be bound by any particular theory, it is believed that during halogenation and titanation the internal electron donor (1) regulates the formation of active sites, (2) regulates the position of titanium on the magnesium-based support and thereby enhances catalyst stereoselectivity, (3) facilitates conversion of the magnesium and titanium moieties into respective halides and (4) regulates the crystallite size of the magnesium halide support during conversion. Thus, provision of the internal electron donor yields a procatalyst composition with enhanced stereoselectivity.

The procatalyst precursor may be a magnesium moiety compound (MagMo), a mixed magnesium titanium compound (MagTi), or a benzoate-containing magnesium chloride compound (BenMag). In an embodiment, the procatalyst precursor is a magnesium moiety ("MagMo") precursor. The "MagMo precursor" contains magnesium as the sole metal component. The MagMo precursor includes a magnesium moiety. Nonlimiting examples of suitable magnesium moieties include anhydrous magnesium chloride and/or its alcohol adduct, magnesium alkoxide or aryloxide, mixed magnesium alkoxy halide, and/or carbonated magnesium dialkoxide or aryloxide. In one embodiment, the MagMo precursor is a magnesium di($C_{1-4}$)alkoxide. In a further embodiment, the MagMo precursor is diethoxymagnesium.

In an embodiment, the procatalyst precursor is a mixed magnesium/titanium compound ("MagTi"). The "MagTi precursor" has the formula $Mg_dTi(OR^e)_fX_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5 to 15; and g is 0.5 to 116, or 1 to 3.

In an embodiment, the procatalyst precursor is a benzoate-containing magnesium chloride material. As used herein, a "benzoate-containing magnesium chloride" ("BenMag") is a magnesium chloride procatalyst (i.e., a halogenated procatalyst precursor) containing a benzoate internal electron donor. The BenMag material may also include a titanium moiety, such as a titanium halide. The benzoate internal donor is labile and can be replaced by other electron donors during procatalyst synthesis. Nonlimiting examples of suitable benzoate groups include ethyl benzoate, methyl benzoate, ethyl p-methoxybenzoate, methyl p-ethoxybenzoate, ethyl p-ethoxybenzoate, ethyl p-chlorobenzoate. In one embodiment, the benzoate group is ethyl benzoate. Nonlimiting examples of suitable BenMag procatalyst precursors include catalysts of the trade names SHAC™ 103 and SHAC™ 310 available from The Dow Chemical Company, Midland, Mich.

In an embodiment, the BenMag procatalyst precursor is a product of halogenation of any procatalyst precursor (i.e., a MagMo precursor or a MagTi precursor) in the presence of a benzoate compound with the structure (I)

wherein $R_1$-$R_5$ are H, $C_1$-$C_{20}$ hydrocarbyl which may contain heteroatoms including F, Cl, Br, I, O, S, N, P, and Si, and R' is a $C_1$-$C_{20}$ hydrocarbyl group which may optionally contain heteroatom(s) including F, Cl, Br, I, O, S, N, P, and Si. Preferably, $R_1$-$R_5$ are selected from H and $C_1$-$C_{20}$ alkyl and R' is selected from $C_1$-$C_{20}$ alkyl and alkoxyalkyl.

Halogenation/titanation of the procatalyst precursor in the presence of the internal electron donor produces a procatalyst composition which includes a combination of a magnesium moiety, a titanium moiety, and the internal electron donor (a substituted phenylene aromatic diester). In an embodiment, the magnesium and titanium moieties are respective halides, such as magnesium chloride and titanium chloride. Bounded by no particular theory, it is believed that the magnesium halide is a support upon which the titanium halide is deposited and into which the internal electron donor is incorporated.

The resulting procatalyst composition has a titanium content of from about 1.0 percent by weight to about 6.0 percent by weight, based on the total weight of the procatalyst composition, or from about 1.0 percent by weight to about 5.5 percent by weight, or from about 2.0 percent by weight to about 5.0 percent by weight. The weight ratio of titanium to magnesium in the solid procatalyst composition is suitably between about 1.3 and about 1.160, or between about 1:4 and about 1:50, or between about 1:6 and 130. The internal electron donor is present in an amount from about 0.1 wt % to about 20.0 wt %, or from about 1.0 wt % to about 15 wt %. The substituted phenylene aromatic diester is present in the procatalyst composition in a molar ratio of internal electron donor to magnesium of from about 0.005:1 to about 1:1, or from about 0.01:1 to about 0.4:1. Weight percent is based on the total weight of the procatalyst composition.

Ethoxide content in the procatalyst composition indicates the completeness of conversion of precursor metal ethoxide into a metal halide. The substituted phenylene aromatic diester assists in converting ethoxide into halide during halogenation. In an embodiment, the procatalyst composition includes from about 0.01 wt % to about 1.0 wt %, or from about 0.05 wt % to about 0.5 wt % ethoxide. Weight percent is based on the total weight of the procatalyst composition.

In an embodiment, the internal electron donor is a mixed internal electron donor. As used herein, a "mixed internal electron donor" is (i) a substituted phenylene aromatic diester, (ii) an electron donor component that donates a pair of electrons to one or more metals present in the resultant procatalyst composition, and (iii) optionally other components. In an embodiment, the electron donor component is a benzoate, such as ethyl benzoate and/or methoxypropan-2-yl benzoate. The procatalyst composition with the mixed internal electron donor can be produced by way of the procatalyst production procedure as previously disclosed.

The internal electron donor includes the substituted phenylene aromatic diester and optionally an electron donor component. The substituted phenylene aromatic diester may be a substituted 1,2-phenylene aromatic diester, a substituted 1,3 phenylene aromatic diester, or a substituted 1,4 phenylene aromatic diester. In an embodiment, the internal electron donor is a 1,2-phenylene aromatic diester with the structure (II) below:

(II)

wherein $R_1$-$R_{14}$ are the same or different. Each of $R_1$-$R_{14}$ is selected from a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one of $R_1$-$R_{14}$ is not hydrogen.

As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-cycloalkenyl-, cycloalkadienyl-, aryl-, aralkyl, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups IV, V, VI, and VII of the Periodic Table. Nonlimiting examples of heteroatoms include: halogens (F, Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. As used herein, the term "silicon-containing hydrocarbyl group" is a hydrocarbyl group that is substituted with one or more silicon atoms. The silicon atom(s) may or may not be in the carbon chain.

In an embodiment, at least one (or two, or three, or four) R group(s) of $R_1$-$R_4$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. Each of $R_5$-$R_{14}$ is hydrogen.

In an embodiment, at least one (or some, or all) R group(s) of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, at least one of $R_1$-$R_4$ and at least one of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_1$-$R_4$ at least one $R_5$-$R_9$ of and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, any consecutive R groups in $R_1$-$R_4$, and/or any consecutive R groups in $R_5$-$R_9$, and/or any consecutive R groups in $R_{10}$-$R_{14}$ may be linked to form an inter-cyclic or an intra-cyclic structure. The inter-intra-cyclic structure may or may not be aromatic. In an embodiment, the inter-/intra-cyclic structure is a $C_5$ or a $C_6$ membered ring.

In an embodiment, at least one of $R_1$-$R_4$ is selected from a substituted hydrocarbyl group having 1 to 20 carbon atoms, an unsubstituted hydrocarbyl group having 1 to 20 carbon atoms, and combinations thereof. Optionally, at least one of $R_5$-$R_{14}$ may be a halogen atom or an alkoxy group having 1 to 20 carbon atoms Optionally, $R_1$-$R_4$, and/or $R_5$-$R_9$, and/or $R_{10}$-$R_{14}$ may be linked to form an inter-cyclic structure or an intra-cyclic structure. The inter-cyclic structure and/or the intra-cyclic structure may or may not be aromatic.

In an embodiment, any consecutive R groups in $R_1$-$R_4$, and/or in $R_5$-$R_9$, and/or in $R_{10}$-$R_{14}$, may be members of a $C_5$-$C_6$-membered ring.

In an embodiment, structure (II) includes $R_1$, $R_3$ and $R_4$ as hydrogen. $R_2$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, structure (II) includes $R_2$ that is methyl, and each of $R_5$-$R_{14}$ is hydrogen. In an embodiment, structure (II) includes R that is ethyl, and each of $R_5$-$R_{14}$ is hydrogen. In an embodiment, structure (II) includes $R_2$ that is t-butyl, and each of $R_5$-$R_{14}$ is hydrogen. In an embodiment, structure (II) includes $R_2$ that is ethoxycarbonyl, and each of $R_5$-$R_{14}$ is hydrogen.

In an embodiment, structure (II) includes $R_2$, $R_3$ and $R_4$ each as hydrogen and $R_1$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, structure (II) includes $R_1$ that is methyl, and each of $R_5$-$R_{14}$ is hydrogen. In an embodiment, structure (II) includes $R_2$ and $R_4$ that are hydrogen and $R_1$ and $R_3$ are the same or different. Each of $R_1$ and $R_3$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, structure (II) includes $R_1$ and $R_3$ that are the same or different. Each of $R_1$ and $R_3$ is selected from a $C_1$-$C_8$ alkyl group, a $C_3$-$C_6$ cycloalkyl group, or a substituted $C_3$-$C_6$ cycloalkyl group. $R_5$-$R_{14}$ are the same or different and each of $R_5$-$R_{14}$ is selected from hydrogen, a $C_1$-$C_8$ alkyl group, and a halogen. Nonlimiting examples of suitable $C_1$-$C_8$ alkyl groups include methyl, ethyl, n-propyl, isopropyl, n-butyl, i-butyl, t-butyl, n-pentyl, i-pentyl, neopentyl, t-pentyl, n-hexyl, and 2,4,4-trimethylpentan-2-yl group. Nonlimiting examples of suitable $C_3$-$C_6$ cycloalkyl groups include cyclopentyl and cyclohexyl groups. In a further embodiment, at least one of $R_5$-$R_{14}$ is a $C_1$-$C_6$ alkyl group or a halogen.

In an embodiment, structure (II) includes $R_1$ that is a methyl group and R; that is a t-butyl group. Each of $R_2$, $R_4$ and $R_5$-$R_{14}$ is hydrogen. In an embodiment, structure (II) includes $R_1$ and $R_3$ that is an isopropyl group. Each of $R_2$, $R_4$ and $R_5$-$R_{14}$ is hydrogen. In an embodiment, structure (II) includes each of $R_1$, $R_5$, and $R_{10}$ as a methyl group and $R_3$ is a t-butyl group. Each of $R_2$, $R_4$, $R_6$-$R_9$ and $R_{11}$-$R_{14}$ is hydrogen. In an embodiment, structure (II) includes each of $R_1$, $R_7$, and $R_{12}$ as a methyl group and $R_3$ is a t-butyl group. Each of $R_2$, $R_4$, $R_5$, $R_6$, $R_8$, $R_9$, $R_{10}$, $R_{11}$, $R_{13}$, and $R_{14}$ is hydrogen. In an embodiment, structure (II) includes $R_1$ as a methyl group and $R_3$ is a t-butyl group. Each of $R_7$ and $R_{12}$ is an ethyl group. Each of $R_2$, $R_4$, $R_5$, $R_6$, $R_8$, $R_9$, $R_{10}$, $R_{11}$, $R_{13}$, and $R_{14}$ is hydrogen. In an embodiment, structure (II) includes each of $R_1$, $R_5$, $R_7$, $R_9$, $R_{10}$, $R_{12}$, and $R_{14}$ as a methyl group and $R_3$ is a t-butyl group. Each of $R_2$, $R_4$, $R_6$, $R_8$, $R_{11}$, and $R_{13}$ is hydrogen. In an embodiment, structure (II) includes $R_1$ as a methyl group and $R_3$ is a t-butyl group. Each of $R_5$, $R_7$, $R_9$, $R_{10}$, $R_{12}$, and $R_{14}$ is an i-propyl group. Each of $R_2$, $R_4$, $R_6$, $R_8$, $R_{11}$, and $R_{13}$ is hydrogen.

In an embodiment, the substituted phenylene aromatic diester has a structure (III) which includes $R_1$ that is a methyl group and $R_3$ is a t-butyl group. Each of $R_2$ and $R_4$ is hydrogen. $R_8$ and $R_9$ are members of a $C_6$ membered ring to form a 1-naphthoyl moiety. $R_{13}$ and $R_{14}$ are members of a $C_6$ membered ring to form another 1-naphthoyl moiety. Structure (III) is provided below.

(III)

In an embodiment, the substituted phenylene aromatic diester has a structure (IV) which includes $R_1$ that is a methyl group and $R_3$ is a t-butyl group. Each of $R_2$ and $R_4$ is hydrogen. $R_6$ and $R_7$ are members of a $C_6$ membered ring to form a 2-naphthoyl moiety. $R_{12}$ and $R_{13}$ are members of a $C_6$ membered ring to form a 2-naphthoyl moiety. Structure (IV) is provided below.

(IV)

In an embodiment, structure (II) includes $R_1$ that is a methyl group and $R_3$ is a t-butyl group. Each of $R_7$ and $R_{12}$ is an ethoxy group. Each of $R_2$, $R_4$, $R_6$, $R_8$, $R_9$, $R_{10}$, $R_{11}$, $R_{13}$, and $R_{14}$ is hydrogen. In an embodiment, structure (II) includes $R_1$ that is a methyl group and $R_3$ is a t-butyl group. Each of $R_7$ and $R_{12}$ is a fluorine atom. Each of $R_2$, $R_4$, $R_5$, $R_6$, $R_8$, $R_9$, $R_{10}$, $R_{11}$, $R_{13}$, and $R_{14}$ is hydrogen. In an embodiment, structure (II) includes $R_1$ that is a methyl group and $R_3$ is a t-butyl group. Each of $R_7$ and $R_{12}$ is a chlorine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (II) includes $R_1$ that is a methyl group and $R_3$ is a t-butyl group. Each of $R_7$ and $R_{12}$ is a bromine atom. Each of $R_2$, $R_4$, $R_5$, $R_6$, $R_8$, $R_9$, $R_{10}$, $R_{11}$, $R_{13}$, and $R_{14}$ is hydrogen. In an embodiment, structure (II) includes $R_1$ that is a methyl group and $R_3$ is a t-butyl group. Each of $R_7$ and $R_{12}$ is an iodine atom. Each of $R_2$, $R_4$, $R_5$, $R_6$, $R_8$, $R_9$, $R_{10}$, $R_{11}$, $R_{13}$, and $R_{14}$ is hydrogen. In an embodiment, structure (II) includes $R_1$ that is a methyl group and $R_3$ is a t-butyl group. Each of $R_6$, $R_7$, $R_{11}$, and $R_{12}$ is a chlorine atom. Each of $R_2$, $R_4$, $R_5$, $R_8$, $R_9$, $R_{10}$, $R_{13}$, and $R_{14}$ is hydrogen. In an embodiment, structure (II) includes $R_1$ that is a methyl group and $R_2$ is a t-butyl group. Each of $R_6$, $R_8$, $R_{11}$, and $R_{12}$ is a chlorine atom. Each of $R_1$, $R_4$, $R_5$, $R_7$, $R_9$, $R_{10}$, $R_{12}$, and $R_{14}$ is hydrogen.

In an embodiment, structure (II) include $R_1$ that is a methyl group and $R_3$ is a t-butyl group. Each of $R_2$, $R_4$ and $R_5$-$R_{14}$ is a fluorine atom. In an embodiment, structure (II) includes $R_1$ that is a methyl group and $R_3$ is a t-butyl group. Each of $R_7$ and $R_{12}$ is a trifluoromethyl group. Each of $R_2$, $R_4$, $R_5$, $R_6$, $R_8$, $R_9$, $R_{10}$, $R_{11}$, $R_{13}$, and $R_{14}$ is hydrogen. In an embodiment, structure (II) includes $R_1$ that is a methyl group and $R_3$ is a t-butyl group. Each of $R_7$ and $R_{12}$ is an ethoxycarbonyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, $R_1$ is methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen. In an embodiment, structure (II) includes $R_1$ that is a methyl group and $R_3$ is a t-butyl group. Each of $R_7$ and $R_{12}$ is an diethylamino group. Each of $R_2$, $R_4$, $R_5$, $R_6$, $R_8$, $R_9$, $R_{10}$, $R_{11}$, $R_{13}$, and $R_{14}$ is hydrogen. In an embodiment, structure (II) includes $R_1$ that is a methyl group and $R_3$ is a 2,4,4-trimethylpentan-2-yl group. Each of $R_2$, $R_4$ and $R_5$-$R_{14}$ is hydrogen. In an embodiment, structure (II) includes $R_1$ and $R_3$, each of which is a sec-butyl group. Each of $R_2$, $R_4$ and $R_5$-$R_{14}$ is hydrogen.

In an embodiment, the substituted phenylene aromatic diester has a structure (V) whereby $R_1$ and $R_2$ are members of a $C_6$ membered ring to form a 1,2-naphthalene moiety. Each of $R_5$-$R_{14}$ is hydrogen, Structure (V) is provided below.

(V)

In an embodiment, the substituted phenylene aromatic diester has a structure (VI) whereby $R_2$ and $R_3$ are members of a C membered ring to form a 2,3-naphthalene moiety. Each of $R_5$-$R_{14}$ hydrogen Structure (VI) is provided below (VI)

In an embodiment, structure (II) includes $R_1$ and $R_4$ that are each a methyl group. Each of $R_2$, $R_3$, $R_5$-$R_9$ and $R_{10}$-$R_{14}$ is hydrogen. In an embodiment, structure (II) includes $R_1$ that is a methyl group $R_4$ is an i-propyl group. Each of $R_2$, $R_3$, $R_5$-$R_9$ and $R_{10}$-$R_{14}$ is hydrogen. In an embodiment, structure (II) includes $R_1$, $R_3$, and $R_4$, each of which is an i-propyl group. Each of $R_2$, $R_5$-$R_9$ and $R_{10}$-$R_{14}$ is hydrogen.

Nonlimiting examples of suitable SPAD for the internal electron donor are set forth in Table 1 below.

TABLE 1

| Compound | Structure | $^1$H NMR (500 MHz, CDCl$_3$, ppm) |
|---|---|---|
| 3-methyl-5-tert-butyl-1,2-phenylene dibenzoate (IED2) | | δ 8.08 (dd, 2H), 8.03 (dd, 2H), 7.53 (tt, 1H, 7.50 (u, 1H), 7.38 (t, 2H), 7.34 (t, 2H), 7.21 (d, 1H), 7.19 (d, 1H), 2.28 (s, 3H), 1.34 (s, 9H). |

TABLE 1-continued

| Compound | Structure | $^1$H NMR (500 MHz, CDCl$_3$, ppm) |
|---|---|---|
| 3,5-iisopropyl-1,2-phenylene dibenzoate (IED3) | | δ 8.08 (dd, 2H), 7.00 (dd, 2H), 7.53 (tt, 1H, 7.48 (u, 1H), 7.39 (t, 2H), 7.31 (t, 2H), 7.11 (d, 1H), 7.09 (d, 1H), 3.11 (heptat, 1H), 2.96 (heptat, 1H), 1.30 (d, 6H), 1.26 (d, 6H). |
| 3,6-dimethyl-1,2-phenylene dibenzoate (IED4) | | δ 8.08 (d, 2H), 7.51 (t, 1H), 7.34 (d, 2H), 7.11 (s, 2H), 2.23 (s, 6H)) |
| 4-t-butyl-1,2-phenylene dibenzoate (IED5) | | δ 8.07 (dd, 4H), 7.54 (m, 2H), 7.30-7.40 (m, 7H), 1.37 (s, 9H). |
| 4-methy 1,2-phenylene dibenzoate (IED6) | | δ (ppm) 8.07 (d, 4H), 7.54 (t, 2H), 7.37 (t, 4H), 7.27 (d, 1H), 7.21 (s, 1H), 7.15 (d, 1H), 2.42 (s, 3H) |
| 1,2-naphthalene dibenzoate (IED7) | | δ 8.21-8.24 (m, 2H), 8.08-8.12 (m, 2H), 7.90-7.96 (m, 2H), 7.86 (d, 1H), 7.60 (m, 1H), 7.50-7.55 (m, 4H), 7.46 (t, 2H), 7.37 (t, 2H). |

TABLE 1-continued

| Compound | Structure | $^1$H NMR (500 MHz, CDCl$_3$, ppm) |
| --- | --- | --- |
| 2,3-naphthalene dibenzoate (IED8) | | δ 8.08-8.2 (m, 4H), 7.86-7.90 (m, 4H), 7.51-7.58 (m, 4H), 7.38 (t, 4H). |
| 3-methyl-5-tert-butyl-1,2-phenylene di(4-methylbenzoate) (IED9) | | δ (ppm) 7.98 (d, 2H), 7.93 (d, 2H), 7.18 (d, 4H), 7.15 (d, 2H), 2.38 (s, 3H), 2.36 (s, 3H), 2.26 (s, 3H), 1.35 (s, 9H). |
| 3-methyl-5-tert-butyl-1,2-phenylene di(2,4,6-trimethylbenzoate) (IED10) | | δ (ppm) 7.25 (s, 1H), 7.21 (s, 1H), 6.81 (d, 4H), 2.36 (s, 3H), 2.30 (d, 6H), 2.25 (s, 6H), 2.23 (s, 6H), 1.36 (s, 9H). |
| 3-methyl-5-tert-butyl-1,2-phenylene di(4-fluorobenzoate) (IED11) | | δ 7.98 (dd, 4H), 7.36 (dd, 4H), 7.21 (s, 1H), 7.17 (s, 1H), 2.26 (s, 3H), 1.34 (s, 9H). |
| 3-methyl-5-tert-butyl-1,2-phenylene di(4-chlorobenzoate) (IED12) | | δ 7.98 (dd, 4H), 7.36 (dd, 4H), 7.21 (s, 1H), 7.17 (s, 1H), 2.26 (s, 3H), 1.34 (s, 9H). |

*comparative

In an embodiment, the substituted phenylene aromatic diester is 5-t-butyl-3-methyl-1,2-phenylene dibenzoate.

In an embodiment, the catalyst composition includes a cocatalyst. As used herein, a "cocatalyst" is a substance capable of converting the procatalyst to an active polymerization catalyst. The cocatalyst may include hydrides, alkyls, or aryls of aluminum, lithium, zinc, tin, cadmium, beryllium, magnesium, and combinations thereof. In an embodiment, the cocatalyst is a hydrocarbyl aluminum compound represented by the formula $R_nAlX_{3-n}$ wherein n=1 2, or 3, R is an alkyl, and X is a halide or alkoxide. Nonlimiting examples of suitable cocatalyst include from trimethylaluminum, triethylaluminum, triisobutylaluminum, and tri-n-hexylaluminum.

In an embodiment, the cocatalyst is triethylaluminum. The molar ratio of aluminum to titanium is from about 5:1 to about 500:1, or from about 10:1 to about 200.1, or from about 15:1 to about 150:1, or from about 20:1 to about 100.1, or from about 30:1 to about 60:1. In another embodiment, the molar ratio of aluminum to titanium is about 35.1.

In an embodiment, the present catalyst composition includes an external electron donor. As used herein, an "external electron donor" (or "EED") is a compound added independent of procatalyst formation and includes at least one functional group that is capable of donating a pair of electrons to a metal atom. A "mixed external electron donor" (or "MEED") is a mixture of two or more external electron donors. Bounded by no particular theory, it is believed that provision of one or more external electron donors in the catalyst composition affects the following properties of the formant polymer: level of tacticity (i.e., xylene soluble material), molecular weight (i.e., melt flow), molecular weight distributor (MWD), melting point, and/or oligomer level.

In an embodiment, the external electron donor may be selected from one or more of the following: a silicon compound, a bidentate compound, an amine, an ether, a carboxylate, a ketone, an amide, a carbamate, a phosphine, a phosphate, a phosphite, a sulfonate, a sulfone, a sulfoxide, and any combination of the foregoing.

In an embodiment, the EED is a silicon compound having the general formula (VII): $SiR_m(OR')_{4-m}$, wherein R independently each occurrence is hydrogen or a hydrocarbyl or an amino group, optionally substituted with one or more substituents containing one or more Group 14, 15, 16, or 17 heteroatoms. R contains up to 20 atoms not counting hydrogen and halogen. R' is a $C_1$-$C_{20}$ alkyl group, and m is 0, 1, or 2. In an embodiment, R is $C_{6-12}$ aryl, alkylaryl or aralkyl, $C_1$-12 cycloalkyl, $C_{1-20}$ linear alkyl or alkenyl, $C_{3-12}$ branched alkyl, or $C_{3-12}$ cyclic amino group, R' is $C_{1-4}$ alkyl, and m is 1 or 2.

Nonlimiting examples of suitable silicon compounds for the EED include dialkoxysilanes, trialkoxysilanes, and tetraalkoxysilanes such as dicyclopentyldimethoxysilane, diisopropyldimethoxysilane, bis(perhydroisoquinolino)dimethoxysilane, methylcyclohexyldimethoxvsilane, tetraethoxysilane, n-propyltrimethoxysilane, n-propyltriethoxysilane, diethylaminotriethoxysilane, bis(trimethylsilylmethyl)dimethoxysilane, and any combination thereof.

In an embodiment, the catalyst composition includes an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the softening point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The ALA may or may not be a component of the EED and/or the MEED. The activity limiting agent may be a carboxylic acid ester, a diether, a poly(alkene glycol), a succinate, a diol ester, and combinations thereof. The carboxylic acid ester can be an aliphatic or aromatic, mono- or poly-carboxylic acid ester. Nonlimiting examples of suitable carboxylic acid esters include benzoates, $C_1$-10 alkyl esters of aliphatic $C_{2-10}$mono-/di-carboxylic acids, $C_2$-10 mono-/poly-carboxylate derivatives of $C_{2-100}$(poly)glycols, $C_{7-100}$ (poly)glycol ethers, and any combination thereof. Further nonlimiting examples of carboxylic acid esters include laurates, myristates, palmitates, stearates, oleates, sebacates, and (poly)(alkylene)glycols, and mixtures thereof. In a further embodiment, the ALA is isopropyl myristate or di-n-butyl sebacate.

The catalyst composition may include any of the foregoing external electron donors in combination with any of the foregoing activity limiting agents. The external electron donor and/or activity limiting agent can be added into the reactor separately. Alternatively, the external electron donor and the activity limiting agent can be mixed together in advance and then added to the catalyst composition and/or into the reactor as a mixture.

In an embodiment, the procatalyst composition is in solid, particulate form and is a Ziegler Natta procatalyst composition with an internal electron donor including a substituted phenylene aromatic diester. The Ziegler-Natta procatalyst composition is in solid, particulate form. The Ziegler Natta procatalyst particles have a D50 from 10 microns to 15 microns. The term "D50," as used herein, is the median particle diameter such that 50% of the sample weight is above the stated particle diameter. In a further embodiment, the substituted phenylene aromatic diester is 5-t-butyl-3-methyl-1,2-phenylene dibenzoate.

In an embodiment, the procatalyst composition is in solid, particulate form and is a Ziegler Natta procatalyst composition with an internal electron donor including a substituted phenylene aromatic diester. The Ziegler-Natta procatalyst composition is in solid, particulate form. The Ziegler Natta procatalyst particles have a D50 from 25 microns to 30 microns. In a further embodiment, the substituted phenylene aromatic diester is 5-t-butyl-3-methyl-1,2-phenylene dibenzoate.

In an embodiment, the process includes injecting into the wet zone a Ziegler-Natta catalyst composition with an internal electron donor including 5-t-butyl-3-methyl-1,2-phenylene dibenzoate.

In an embodiment, the process includes injecting into the wet zone particles of a Ziegler Natta procatalyst composition with an internal electron donor including a substituted phenylene aromatic diester. The procatalyst particles have a D50 from 10 microns to 15 microns. In a further embodiment, the Ziegler-Natta procatalyst particles have a D50 of 12 microns. In an embodiment, the substituted phenylene aromatic diester is 5-t-butyl-3-methyl-1,2-phenylene dibenzoate.

In an embodiment, the process includes injecting into the wet zone particles of a Ziegler-Natta procatalyst composition with an internal electron donor including a substituted phenylene aromatic diester. The Ziegler-Natta procatalyst particles have a D50 from 25 microns to 30 microns. In a further embodiment, the Ziegler-Natta procatalyst particles have a D50 of 27 microns. In an embodiment, the substituted phenylene aromatic diester is 5-t-butyl-3-methyl-1,2-phenylene dibenzoate.

In an embodiment, the process includes injecting, at the injection point, (i) a catalyst composition comprising a procatalyst composition comprising a substituted phenylene aromatic diester, (ii) a cocatalyst, and (iii) an external electron donor.

The present disclosure includes explanations of theories that are believed to be behind the advantageous performance aspects of the various embodiments. However, these theories are only intended to be explanatory in nature and are not intended to limit the scope of the embodiments. The embodiments may certainly incorporate and utilize various other theories or phenomena in operation. Furthermore, the theories discussed may not be applicable to all of the embodiments.

It should also be understood that aspects of the various embodiments may be interchanged either wholly or in part. Moreover, those of ordinary skill in the art will appreciate that the foregoing description is by way of example only, and is not intended to limit the broader concepts and teachings of the disclosure.

What is claimed:

1. A method for controlling a fluidized bed reactor comprising:
    forming a fluidized bed in a reactor, the fluidized bed including monomers and catalyst, and producing a polymer product;
    discharging the polymer product from the reactor to a product discharge tank;
    discharging the polymer product from the product discharge tank to a blow tank;
    measuring blow tank pressure as the polymer product enters the blow tank and flashes; and
    changing one or more reactor operating inputs based on the measured blow tank pressure.

2. The method for controlling a fluidized bed reactor of claim 1, further comprising determining blow tank peak pressure and using the blow tank peak pressure to change the one or more reactor operating inputs.

3. The method for controlling a fluidized bed reactor of claim 1, further comprising:
    discharging the polymer product from the product discharge tank to the blow tank two or more times;
    measuring blow tank pressure each time the polymer product is discharged from the product discharge tank to the blow tank to determine multiple blow tank pressures, each corresponding to a discharge of product into the blow tank; and
    changing the one or more reactor operating inputs based on the multiple blow tank pressures.

4. The method for controlling a fluidized bed reactor of claim 3, further comprising:
    measuring the peak pressure for each discharge of product into the blow tank; and
    changing the one or more reactor operating inputs based on the multiple blow tank peak pressures.

5. The method for controlling a fluidized bed reactor of claim 4, further comprising:
    averaging two or more of the multiple blow tank peak pressures to obtain an average blow tank peak pressure; and
    changing the one or more reactor operating inputs based on the average blow tank peak pressures.

6. The method for controlling a fluidized bed reactor of claim 5, wherein the average blow tank peak pressure is a weighted average that emphasizes more recent measurements.

7. The method for controlling a fluidized bed reactor of claim 1, further comprising creating a blow tank pressure profile each time product is discharged into the blow tank; and using the blow tank pressure profile to change the one or more reactor operating inputs.

8. The method for controlling a fluidized bed reactor of claim 7, wherein multiple blow tank pressure profiles are used to change the one or more reactor operating inputs.

9. The method for controlling a fluidized bed reactor of claim 1, wherein the one or more reactor operating inputs are changed to control a wet zone or fluidized bed penetration in the reactor.

10. The method for controlling a fluidized bed reactor of claim 1, wherein the reactor operating inputs include one or more of recycle gas flowrate, recycle gas cooling, bed temperature set point, addition of monomer raw materials, addition of fluidizing medium, removal of fluidizing medium, discharge of product to the product discharge tank, addition of catalyst/co-catalyst/procatalyst, removal of catalyst/co-catalyst/procatalyst, monomer partial pressure, phase of material entering the reactor, and gas/liquid fraction (or weight percent condensation) entering the reactor.

11. The method for controlling a fluidized bed reactor of claim 1, further comprising relieving pressure from the product discharge tank prior to discharging the product to the blow tank.

12. The method for controlling a fluidized bed reactor of claim 11, wherein the pressure from the product discharge tank is relieved to the low pressure side of the reactor (or the top of the reactor).

13. The method for controlling a fluidized bed reactor of claim 1, further comprising changing the product discharge tank to a first reference pressure prior to discharging the polymer product from the product discharge tank to the blow tank.

14. The method for controlling a fluidized bed reactor of claim 1, further comprising changing the blow tank to a second reference pressure prior to discharging the polymer product from the product discharge tank to the blow tank.

15. The method for controlling a fluidized bed reactor of claim 3, wherein rate of change and/or acceleration of rate of change are determined from the multiple blow tank pressure measurements and used to control the one or more reactor operating inputs.

* * * * *